(12) United States Patent
Watanabe

(10) Patent No.: US 12,141,010 B2
(45) Date of Patent: Nov. 12, 2024

(54) INFORMATION PROCESSING APPARATUS AND INFORMATION PROCESSING METHOD

(71) Applicant: SONY SEMICONDUCTOR SOLUTIONS CORPORATION, Kanagawa (JP)

(72) Inventor: Goshi Watanabe, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1 day.

(21) Appl. No.: 18/006,410

(22) PCT Filed: Jul. 19, 2021

(86) PCT No.: PCT/JP2021/026972
§ 371 (c)(1),
(2) Date: Jan. 23, 2023

(87) PCT Pub. No.: WO2022/024842
PCT Pub. Date: Feb. 3, 2022

(65) Prior Publication Data
US 2023/0266811 A1 Aug. 24, 2023

(30) Foreign Application Priority Data
Jul. 31, 2020 (JP) .................................. 2020-131127

(51) Int. Cl.
G06F 1/3228 (2019.01)
G06F 1/3287 (2019.01)
G06T 1/20 (2006.01)

(52) U.S. Cl.
CPC .......... *G06F 1/3228* (2013.01); *G06F 1/3287* (2013.01)

(58) Field of Classification Search
CPC ........ G06F 1/3228; G06F 1/3287; G06T 1/20
See application file for complete search history.

(56) References Cited

U.S. PATENT DOCUMENTS

| 2004/0044915 A1* | 3/2004 | Bose | .......................... G06F 1/04 |
| | | | 712/E9.055 |
| 2014/0068231 A1* | 3/2014 | Saeki | .................. G06F 9/30181 |
| | | | 712/221 |

(Continued)

FOREIGN PATENT DOCUMENTS

| JP | 2000-236502 A | 8/2000 |
| JP | 2008-199257 A | 8/2008 |

(Continued)

*Primary Examiner* — Jaweed A Abbaszadeh
*Assistant Examiner* — Gayathri Sampath
(74) *Attorney, Agent, or Firm* — CHIP LAW GROUP

(57) ABSTRACT

An information processing apparatus according to an embodiment of the present disclosure includes: a processor including a first data processor that is configured to perform a piece of first data processing on the basis of a piece of first data to thereby generate a piece of second data; a selector that selects one piece of data from among a plurality of pieces of data including the piece of first data and the piece of second data; an arithmetic processor that is configured to selectively perform one of a plurality of pieces of arithmetic processing, and performs a piece of arithmetic processing selected from among the plurality of pieces of arithmetic processing on the basis of the piece of data selected by the selector; and a supply section that controls supply of electric power to the first data processor in accordance with the piece of data selected by the selector from among the plurality of pieces of data.

14 Claims, 14 Drawing Sheets

(56) References Cited

U.S. PATENT DOCUMENTS

2014/0344602 A1* 11/2014 Son ...................... G06F 8/4432
                                                              713/323
2016/0364835 A1* 12/2016 Srebnik ................ G06F 9/3891
2019/0171614 A1*  6/2019 Nakagawa ............. G06F 13/00

FOREIGN PATENT DOCUMENTS

JP    2017-196869 A    11/2017
JP    2019-200657 A    11/2019

* cited by examiner

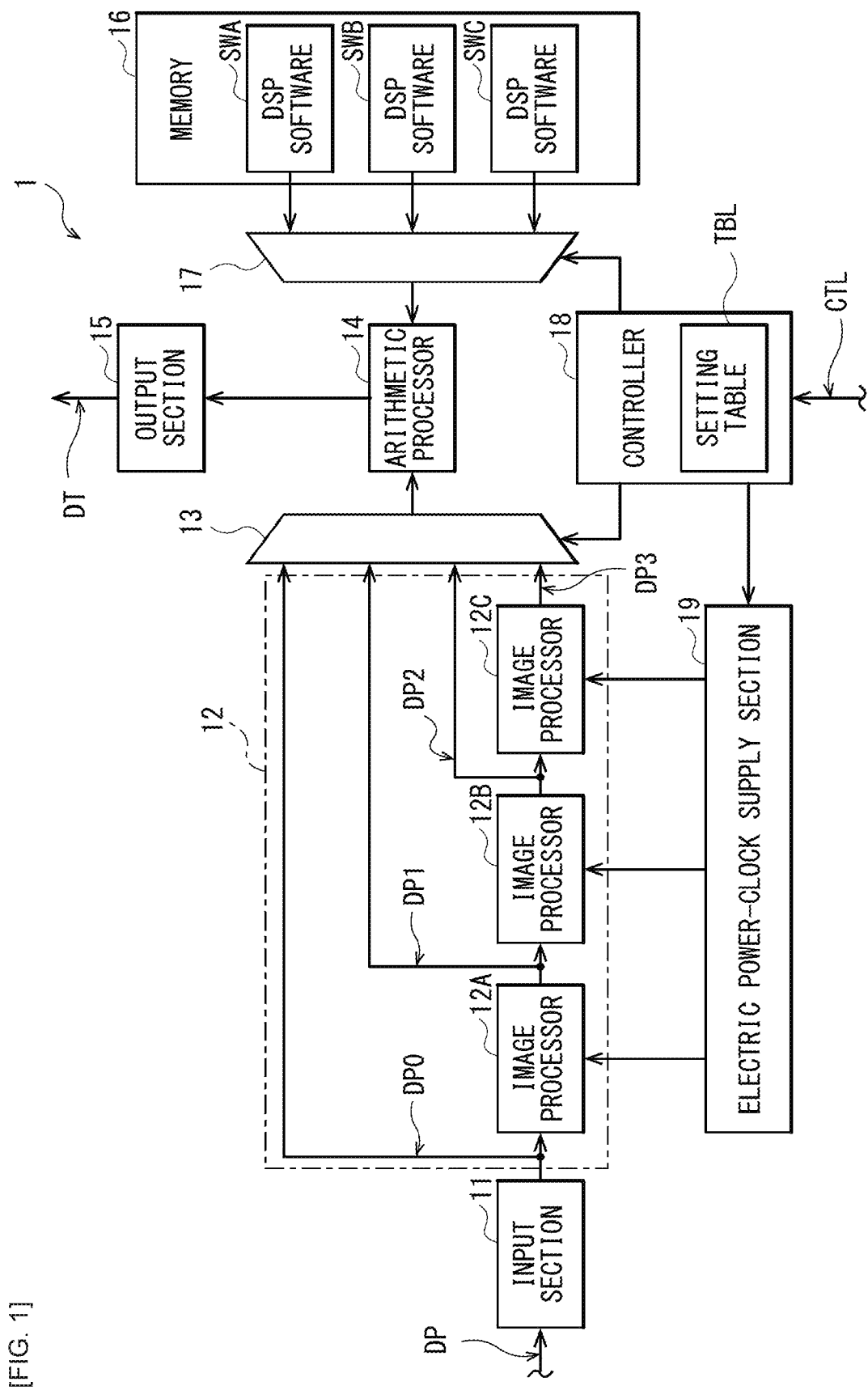
[FIG. 1]

[FIG. 2]

| DSP SOFTWARE | ISP PROCESSING |
|---|---|
| DSP PROCESSING DSPA | ISP PROCESSING ISPB |
| DSP PROCESSING DSPB | ISP PROCESSING ISPC |
| DSP PROCESSING DSPC | ISP PROCESSING ISPA |

TBL

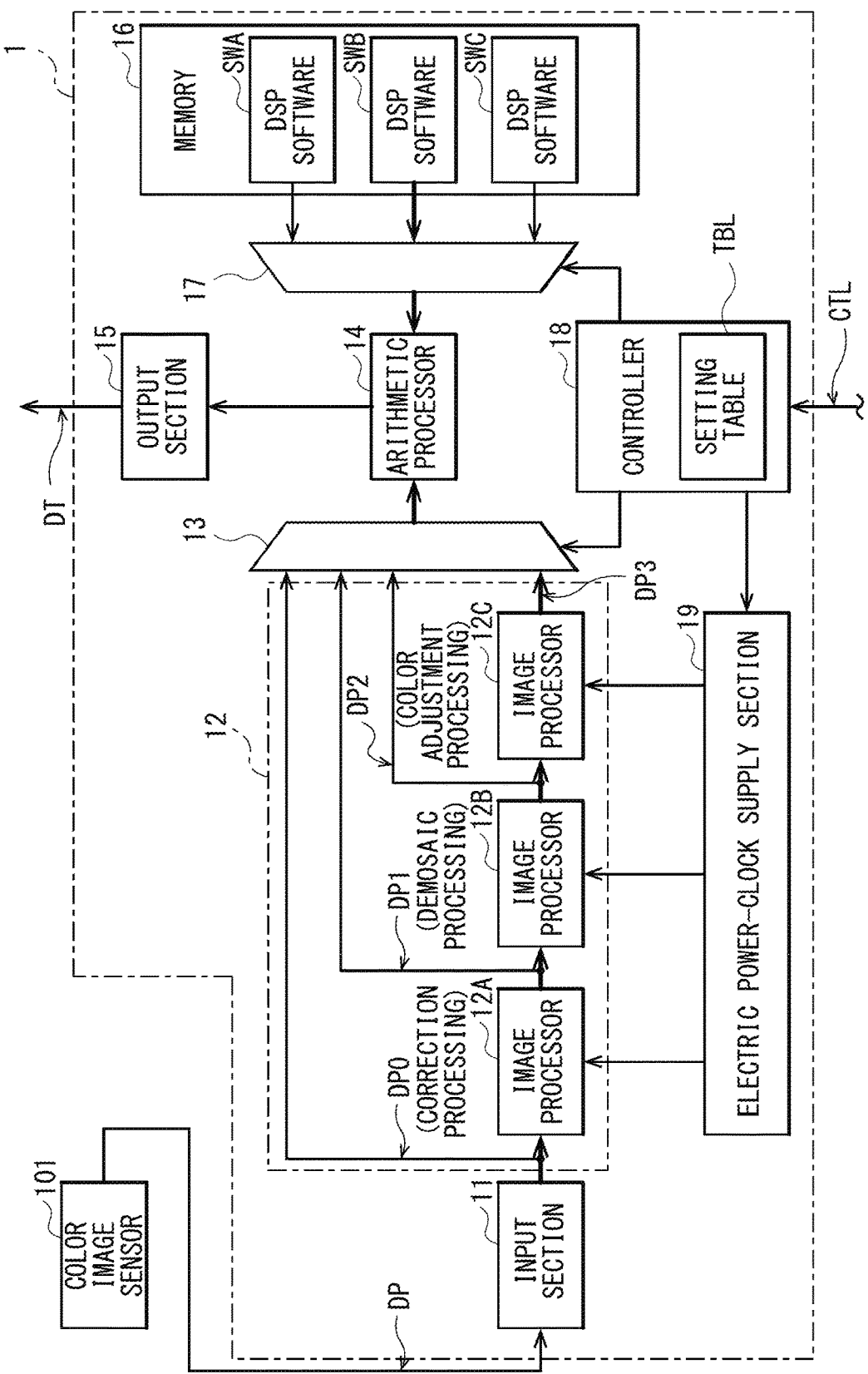
[FIG. 3]

[FIG. 4]
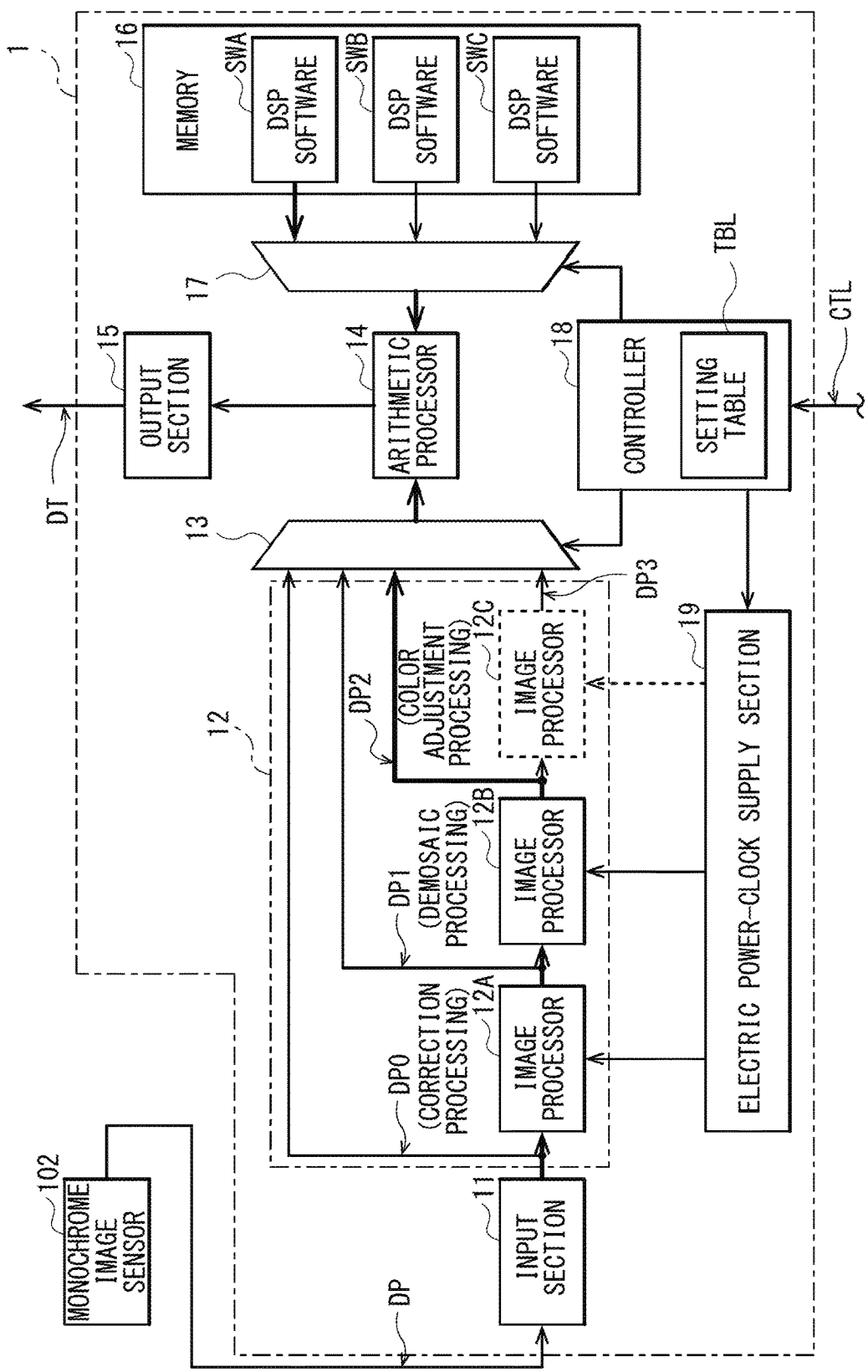

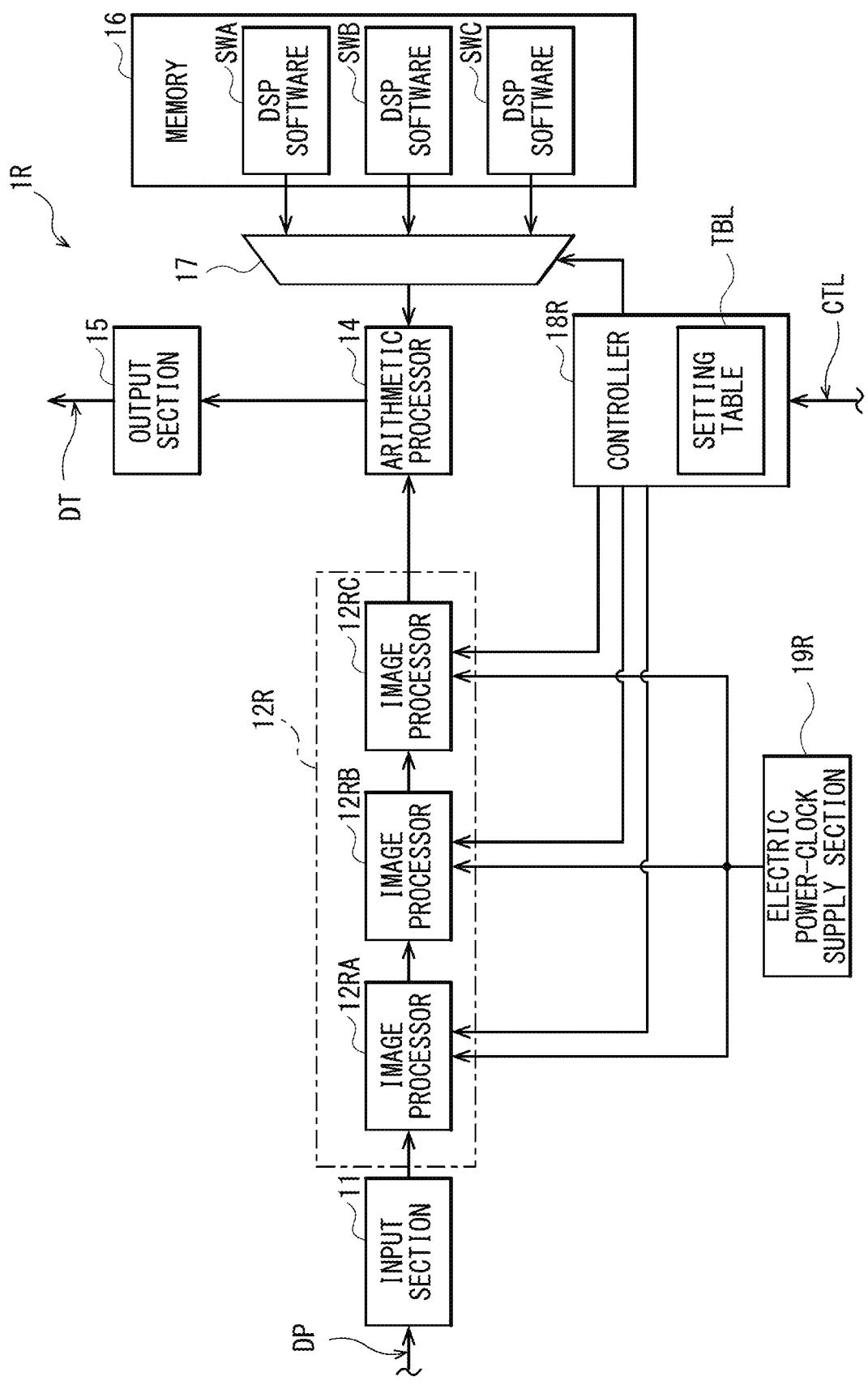
[FIG. 5]

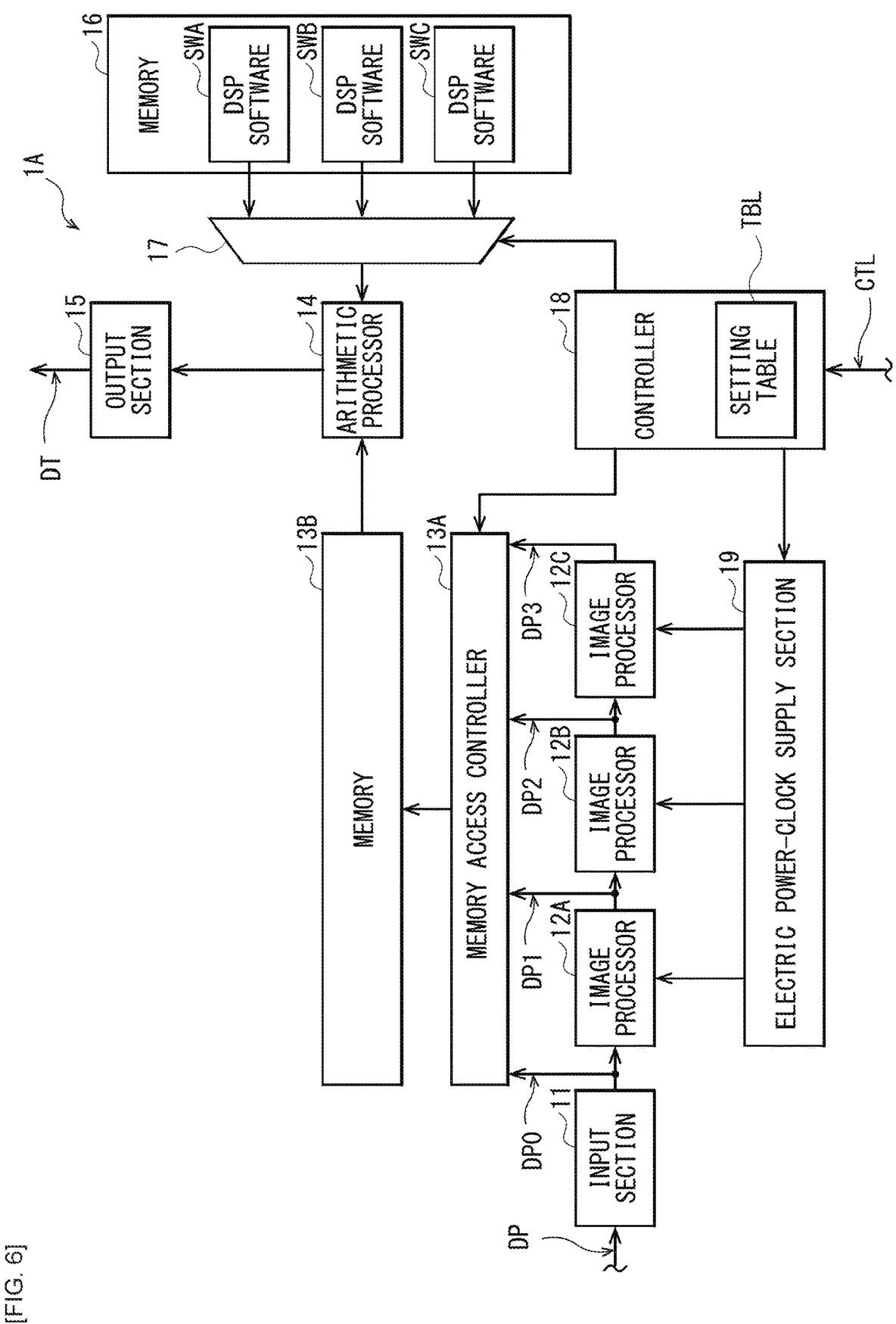
[FIG. 6]

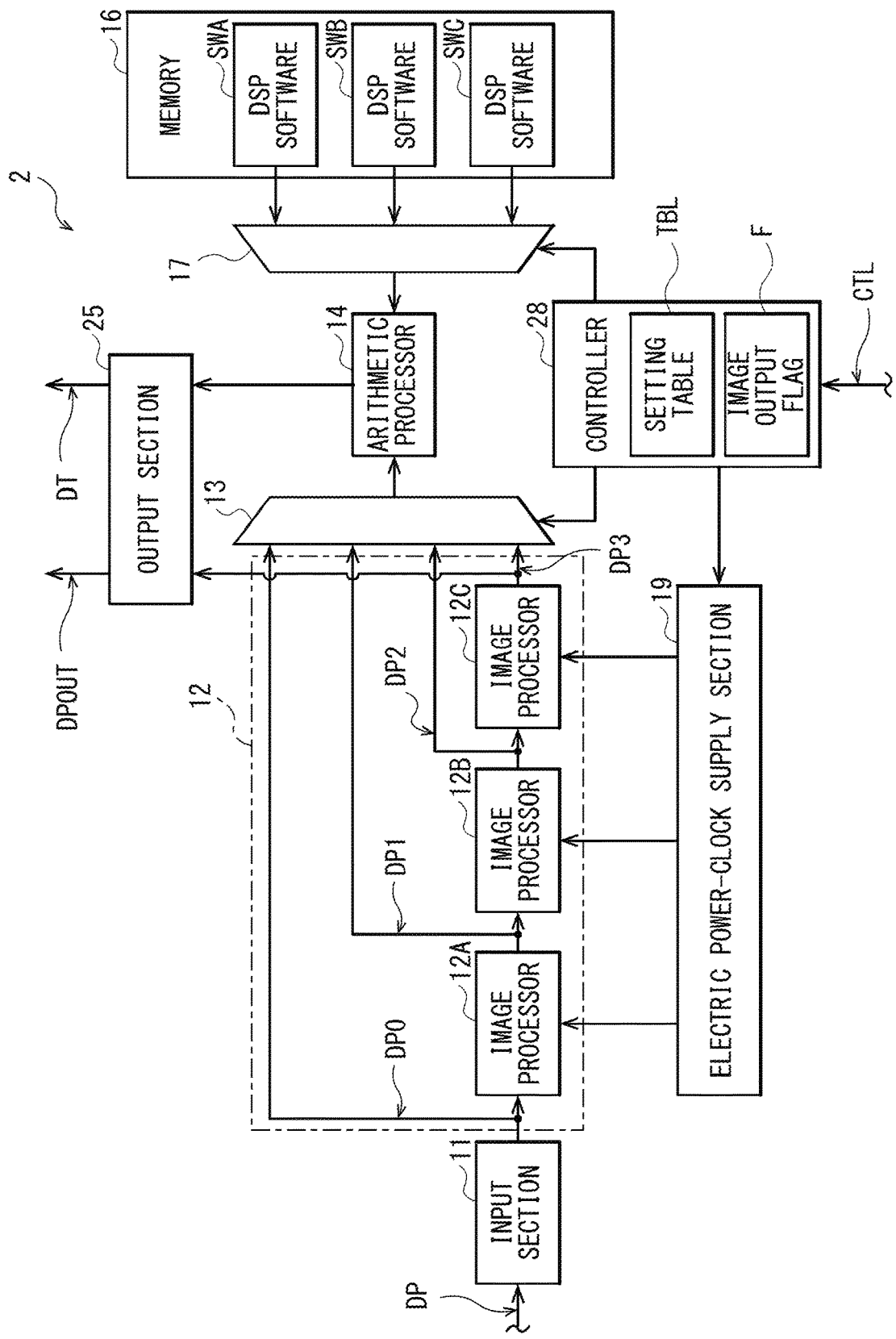

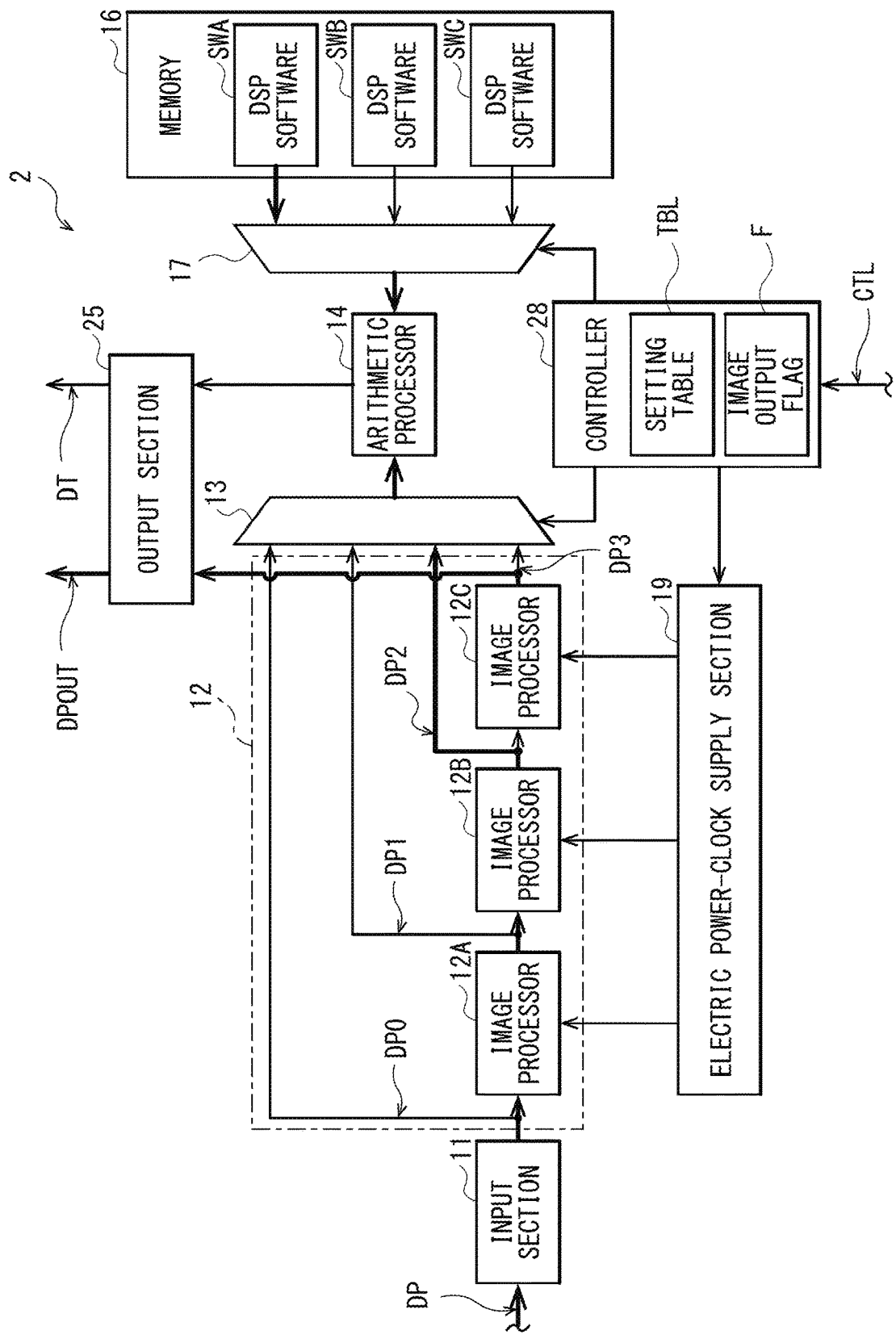
[FIG. 8]

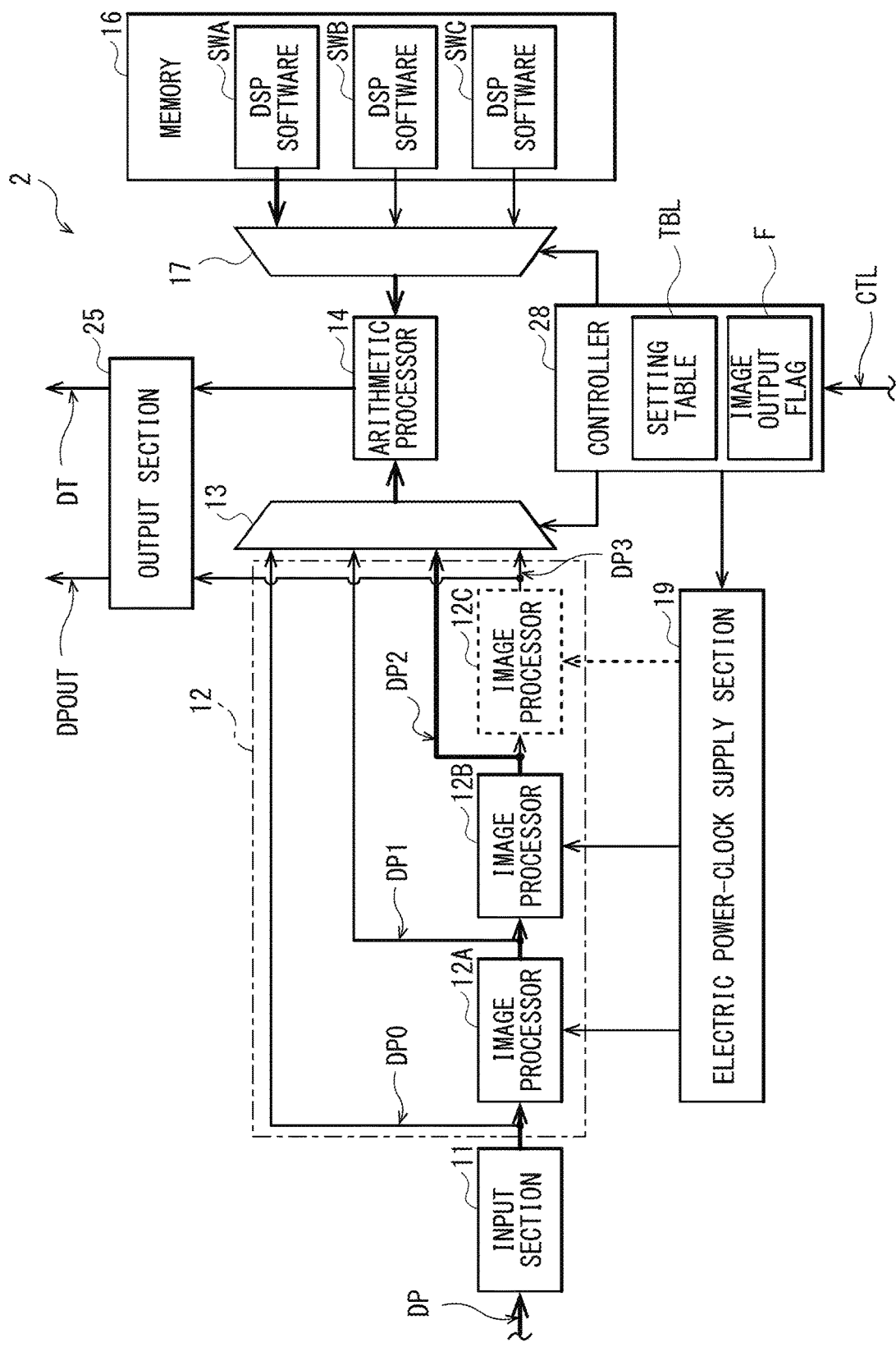
[FIG. 9]

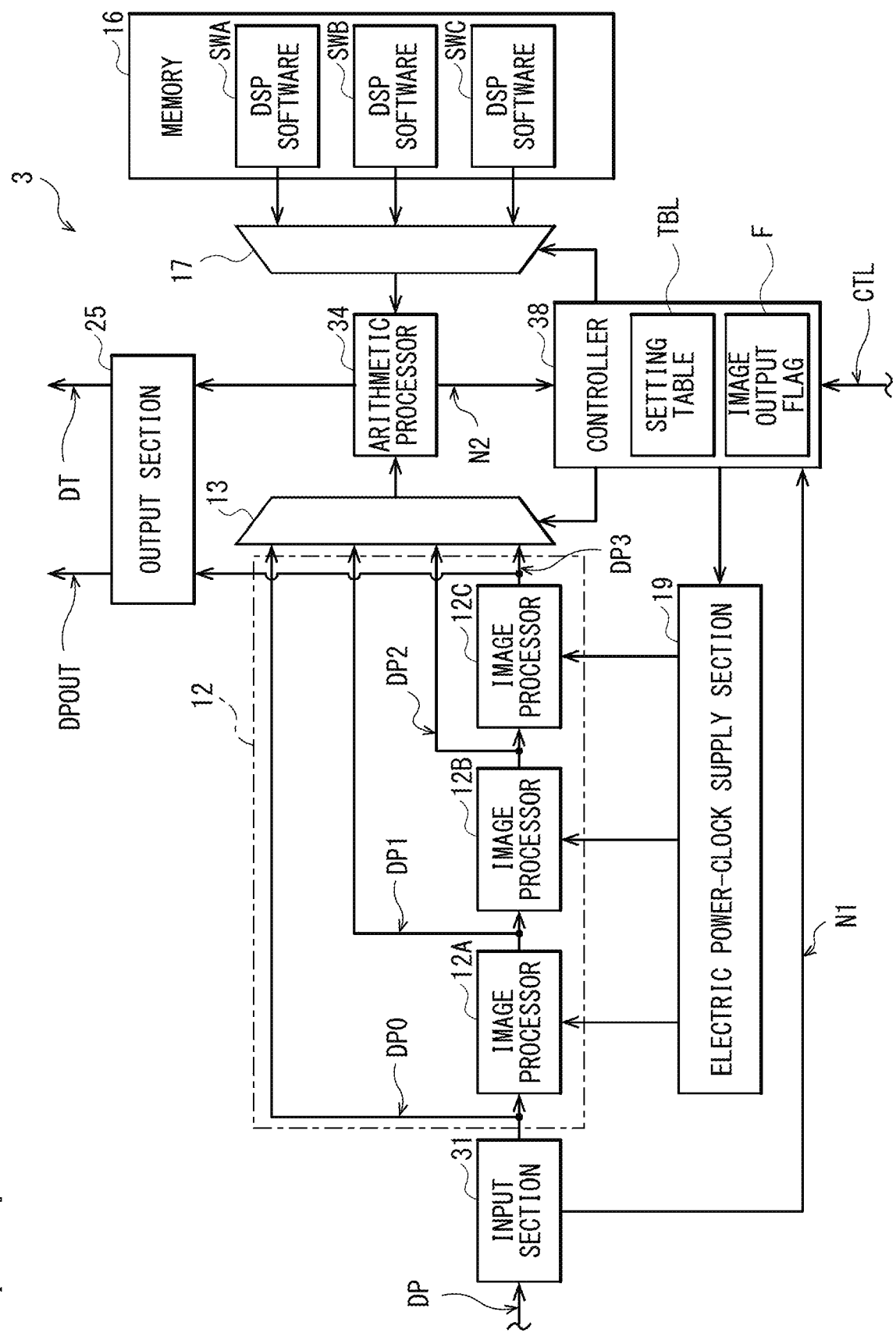
[FIG. 10]

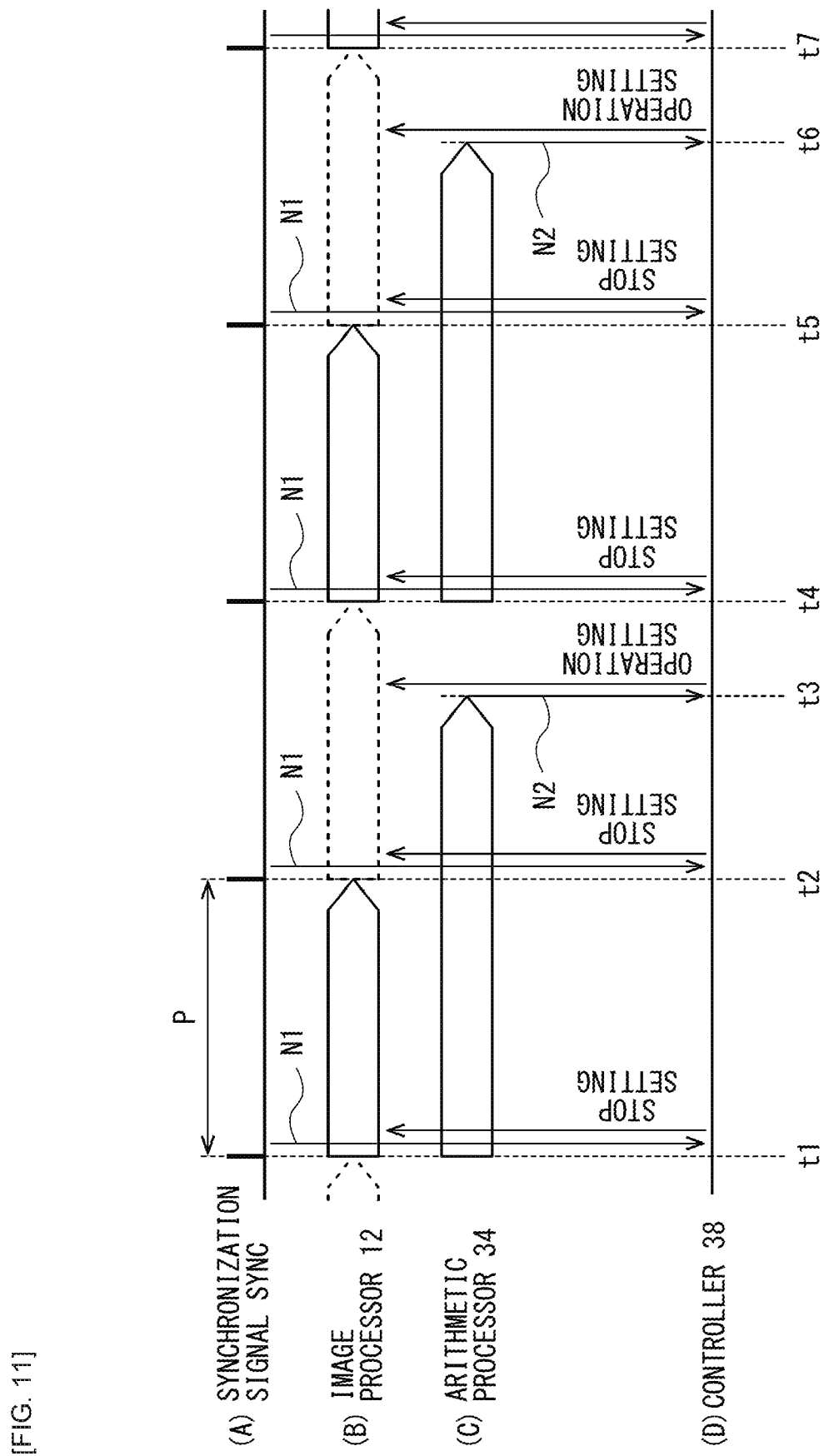
[FIG. 11]

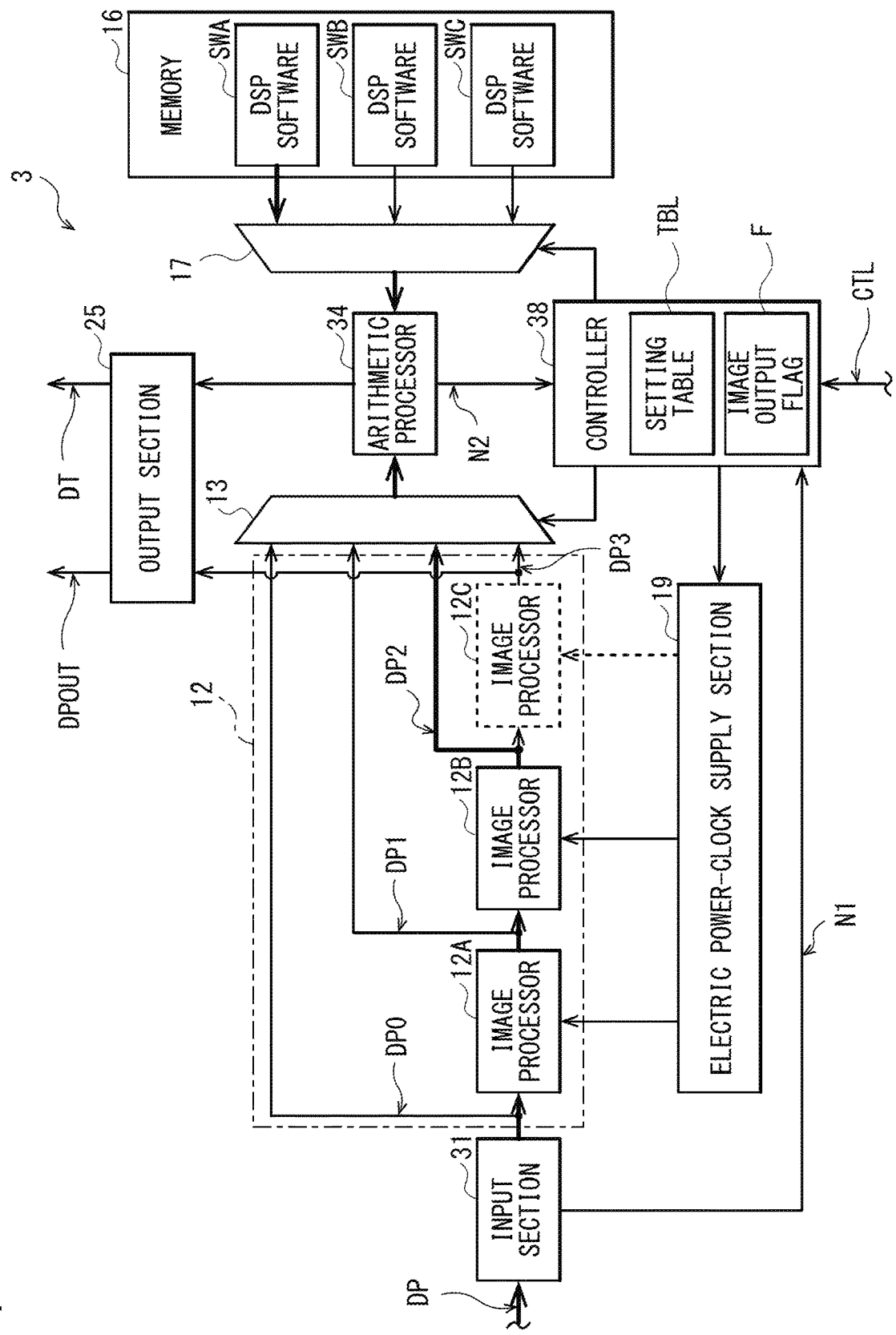
[FIG. 12A]

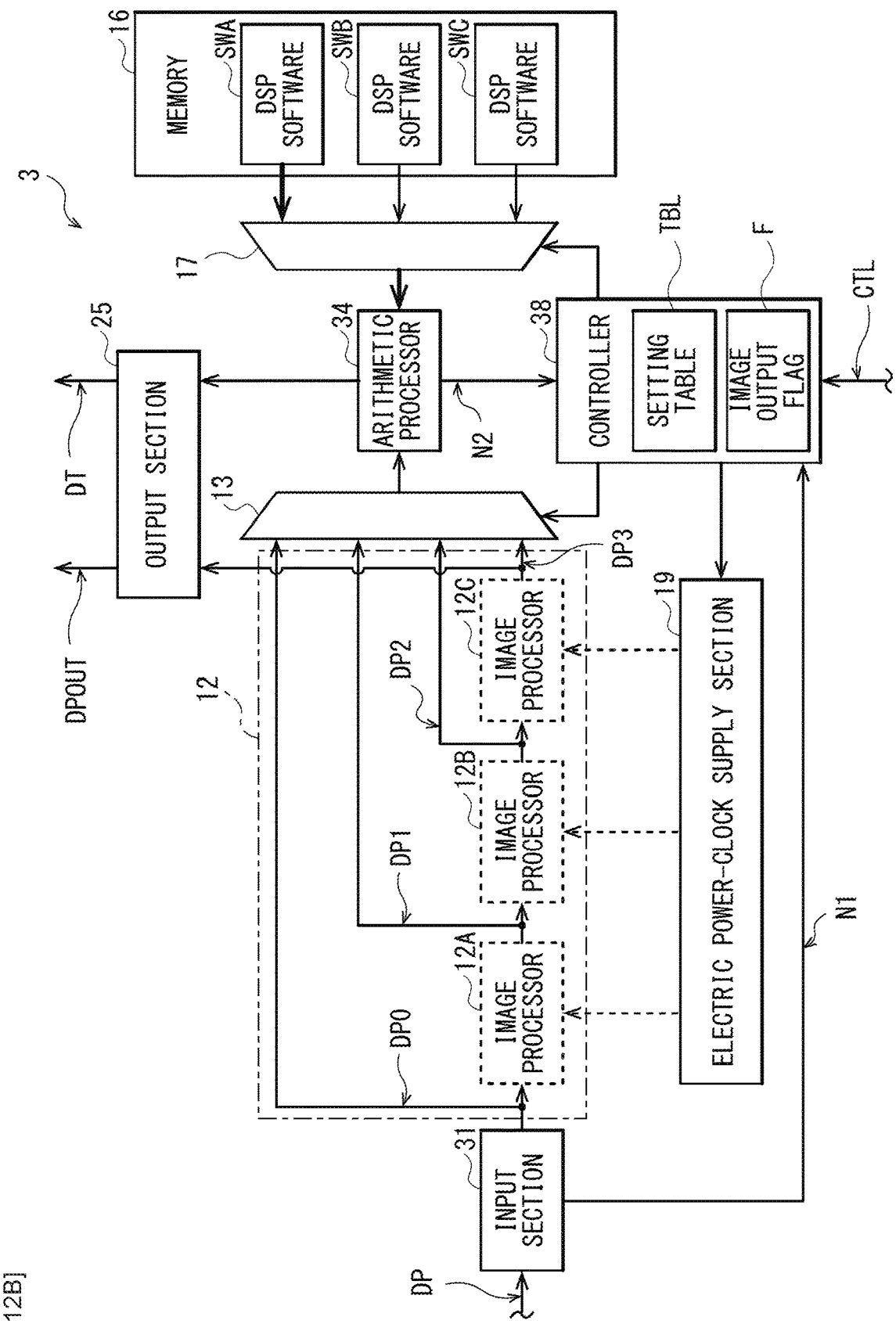
[FIG. 12B]

[FIG. 13]
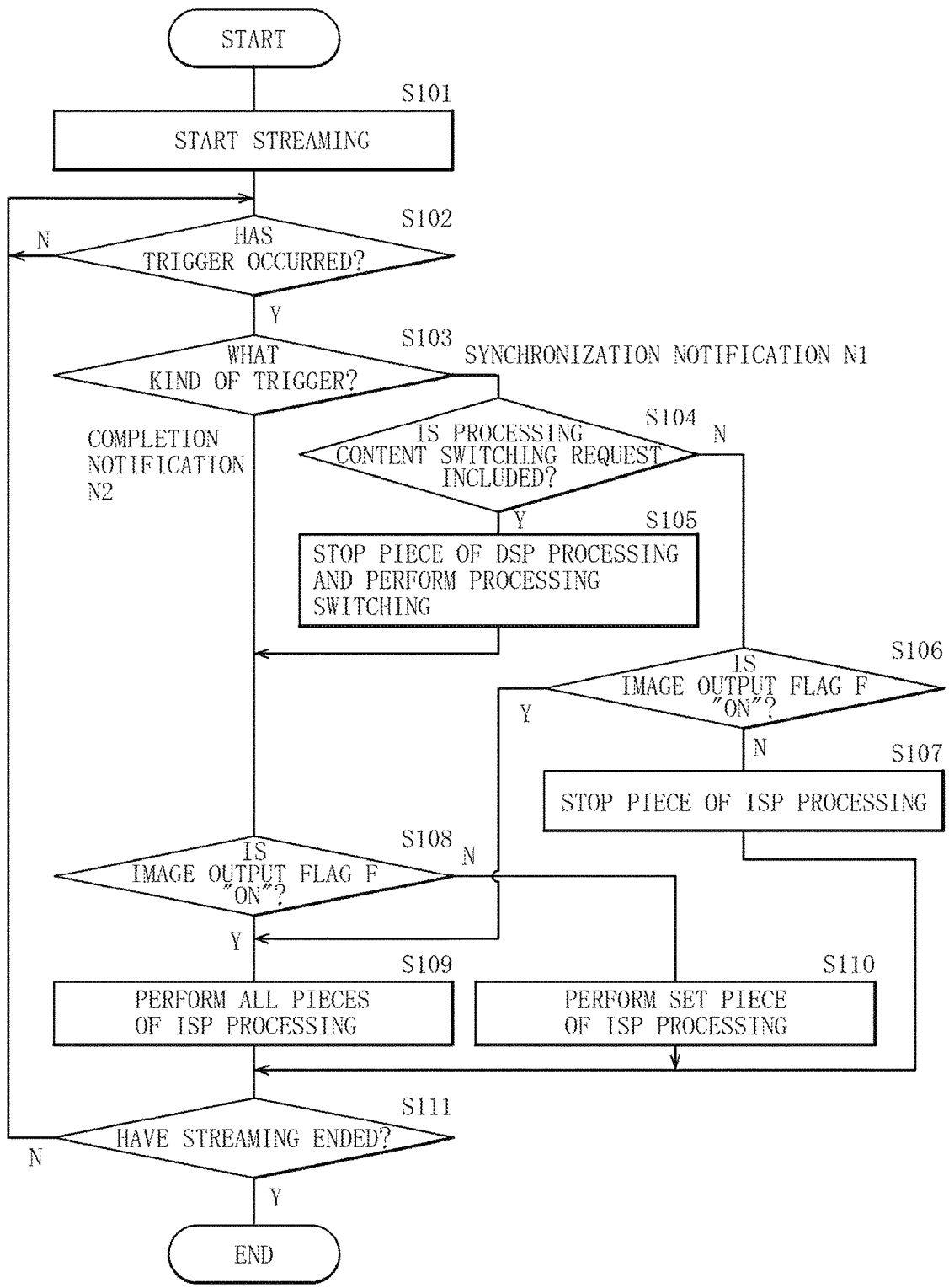

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/026972 filed on Jul. 19, 2021, which claims priority benefit of Japanese Patent Application No. JP 2020-131127 filed in the Japan Patent Office on Jul. 31, 2020. Each of the above-referenced applications is hereby incorporated herein by reference in its entirety.

TECHNICAL FIELD

The present disclosure relates to an information processing apparatus that processes information, and an information processing method to be used in such an information processing apparatus.

BACKGROUND ART

In general, in electronic devices, reduction in electric power consumption is desired. For example, PTL 1 discloses a recording apparatus that stops a recording operation and cuts off electric power to a mechanical circuit section in a case where a broadcast content is a commercial message.

CITATION LIST

Patent Literature

PTL 1: Japanese Unexamined Patent Application Publication No. 2000-236502

SUMMARY OF THE INVENTION

Even in information processing apparatuses, reduction in electric power consumption is desired, and further reduction in electric power consumption is expected.

It is desirable to provide an information processing apparatus and an information processing method that make it possible to reduce electric power consumption.

An information processing apparatus according to an embodiment of the present disclosure includes a processor, a selector, an arithmetic processor, and a supply section. The processor includes a first data processor that is configured to perform a piece of first data processing on the basis of a piece of first data to thereby generate a piece of second data. The selector is configured to select one piece of data from among a plurality of pieces of data including the piece of first data and the piece of second data. The arithmetic processor is able to selectively perform one of a plurality of pieces of arithmetic processing, and is configured to perform a piece of arithmetic processing selected from among the plurality of pieces of arithmetic processing on the basis of the piece of data selected by the selector. The supply section is configured to control supply of electric power to the first data processor in accordance with the piece of data selected by the selector from among the plurality of pieces of data.

An information processing method according to an embodiment of the present disclosure includes: selecting one piece of data from among a plurality of pieces of data in a processor including a first data processor that is configured to perform a piece of first data processing on the basis of a piece of first data to thereby generate a piece of second data, the plurality of pieces of data including the piece of first data and the piece of second data; selecting one piece of arithmetic processing from among a plurality of pieces of arithmetic processing; performing the selected piece of arithmetic processing on the basis of the selected piece of data; and controlling supply of electric power to the first data processor in accordance with the piece of data selected from among the plurality of pieces of data.

In the information processing apparatus and the information processing method according to the embodiments of the present disclosure, one piece of data is selected from among the plurality of pieces of data including the piece of first data and the piece of second data in the processor including the first data processor that is able to generate the piece of second data by performing the piece of first data processing on the basis of the piece of first data, and one piece of arithmetic processing is selected from among the plurality of pieces of arithmetic processing. The selected piece of arithmetic processing is then performed on the basis of the selected piece of data. Supply of electric power to the first data processor is controlled in accordance with the selected piece of data.

BRIEF DESCRIPTION OF DRAWINGS

FIG. 1 is a block diagram illustrating a configuration example of an image processing apparatus according to a first embodiment of the present disclosure.

FIG. 2 is an explanatory diagram illustrating a configuration example of a setting table illustrated in FIG. 1.

FIG. 3 is an explanatory diagram illustrating an operation example of the image processing apparatus illustrated in FIG. 1.

FIG. 4 is an explanatory diagram illustrating another operation example of the image processing apparatus illustrated in FIG. 1.

FIG. 5 is a block diagram illustrating a configuration example of an image processing apparatus according to a comparative example.

FIG. 6 is a block diagram illustrating a configuration example of an image processing apparatus according to a modification example of the first embodiment.

FIG. 7 is a block diagram illustrating a configuration example of an image processing apparatus according to a second embodiment.

FIG. 8 is an explanatory diagram illustrating an operation example of the image processing apparatus illustrated in FIG. 7.

FIG. 9 is an explanatory diagram illustrating another operation example of the image processing apparatus illustrated in FIG. 7.

FIG. 10 is a block diagram illustrating a configuration example of an image processing apparatus according to a third embodiment.

FIG. 11 is a timing chart illustrating an operation example of the image processing apparatus illustrated in FIG. 10.

FIG. 12A is an explanatory diagram illustrating an operation example of the image processing apparatus illustrated in FIG. 10.

FIG. 12B is an explanatory diagram illustrating another operation example of the image processing apparatus illustrated in FIG. 10.

FIG. 13 is a flow chart illustrating an operation example of the image processing apparatus illustrated in FIG. 10.

MODES FOR CARRYING OUT THE INVENTION

In the following, some embodiments of the present disclosure are described in detail with reference to the drawings. It is to be noted that description is given in the following order.
1. First Embodiment
2. Second Embodiment
3. Third Embodiment

1. First Embodiment

Configuration Example

FIG. 1 illustrates a configuration example of an information processing apparatus (image processing apparatus 1) according to an embodiment. It is to be noted that an information processing method according to an embodiment of the present disclosure is embodied by the present embodiment, and thus is also described. The image processing apparatus 1 includes an input section 11, an image processor 12, a selector 13, an arithmetic processor 14, an output section 15, a memory 16, a selector 17, a controller 18, and an electric power-clock supply section 19.

The input section 11 includes an input interface of the image processing apparatus 1, and is coupled to, for example, an image sensor. The input section 11 is configured to receive a piece of image data DP transmitted from the image sensor and supply the piece of image data DP as a piece of image data DP0 to the image processor 12.

The image processor 12 includes an ISP (Image Signal Processor), and is configured to perform a predetermined piece of image processing on a piece of image data supplied from the input section 11. The image processor 12 includes a plurality of image processors (three image processors 12A, 12B, and 12C in this example). The image processor 12A is configured to generate a piece of image data DP1 by performing a piece of image processing (ISP processing ISPA) on the basis of the piece of image data DP0 supplied from the input section 11. The image processor 12B is configured to generate a piece of image data DP2 by performing a piece of image processing (ISP processing ISPB) on the basis of the piece of image data DP1 supplied from the image processor 12A. The image processor 12C is configured to generate a piece of image data DP3 by performing a piece of image processing (ISP processing ISPC) on the basis of the piece of image data DP2 supplied from the image processor 12B. The pieces of image processing in the image processors 12A, 12B, and 12C are different from each other, and examples of the pieces of image processing include image correction processing, demosaic processing, color adjustment processing, and the like. Electric power and a clock signal are selectively supplied from the electric power-clock supply section 19 to each of the image processors 12A, 12B, and 12C. For example, in a case where electric power and the clock signal are supplied to the image processor 12A, the image processor 12A performs a piece of processing on the basis of this electric power and this clock signal, and in a case where electric power and the clock signal are not supplied to the image processor 12A, the image processor 12A stops the piece of processing. The same applies to the image processors 12B and 12C. In the image processing apparatus 1, it is possible to supply electric power and the clock signal to an image processor that is to perform a piece of processing of the image processors 12A, 12B, and 12C and stop supply of electric power and the clock signal to an image processor that is not to perform a piece of processing, which makes it possible to effectively reduce electric power consumption.

The selector 13 is configured to select one piece of image data from among the pieces of image data DP0 to DP3 and supply the selected piece of image data to the arithmetic processor 14 on the basis of an instruction from the controller 18. Thus, in the image processing apparatus 1, for example, in a case where the image processor 12C does not perform the piece of processing, it is possible to supply, to the arithmetic processor 14, the piece of image data DP2 generated by the image processor 12B preceding to the image processor 12C, which makes it possible to improve latency in the image processing apparatus 1.

The arithmetic processor 14 includes a DSP (Digital Signal Processor), and is configured to perform a piece of arithmetic processing on the piece of image data supplied from the selector 13 by executing a piece of software supplied from the memory 16. Thus, the arithmetic processor 14 is able to perform various pieces of arithmetic processing corresponding to the supplied piece of software.

The output section 15 is configured to output a processing result by the arithmetic processor 14 as a piece of processing data DT.

The memory 16 is configured to store a plurality of pieces of software (three pieces of DSP software SWA, SWB, and SWC in this example). The three pieces of DSP software SWA, SWB, and SWC are executed by the arithmetic processor 14. The arithmetic processor 14 executes the DSP software SWA to perform a piece of arithmetic processing (DSP processing DSPA), executes the DSP software SWB to perform a piece of arithmetic processing (DSP processing DSPB), and executes the DSP software SWC to perform a piece of arithmetic processing (DSP processing DSPC). Examples of these pieces of DSP processing DSPA, DSPB, and DSPC include a piece of processing for detecting a human included in an image with use of a learning model such as a DNN (Deep Neural Network), a piece of processing for estimating the posture of a human with use of a learning model such as a DNN, and various pieces of signal processing. The memory 16 may include, for example, a volatile memory such as a DRAM (Dynamic Random Access Memory) or a nonvolatile memory such a flash memory.

The selector 17 is configured to select one piece of software from among the plurality of pieces of software (three pieces of DSP software SWA, SWB, and SWC in this example) stored in the memory 16 and supply the selected piece of software to the arithmetic processor 14 on the basis of an instruction from the controller 18.

The controller 18 is configured to control pieces of processing in the image processor 12 and the arithmetic processor 14 on the basis of a piece of control data CTL supplied from outside. A setting table TBL is registered in the controller 18.

FIG. 2 illustrates an example of the setting table TBL. The setting table TBL illustrates a correspondence relation between a piece of ISP processing to be performed by the image processor 12 and a piece of DSP processing to be performed by the arithmetic processor 14. For example, in this example, the "DSP processing DSPA" corresponds to the "ISP processing ISPB". This indicates that the arithmetic processor 14 performs the "DSP processing DSPA" on the basis of the piece of image data DP2 supplied from the image processor 12B that performs the "ISP processing ISPB". In other words, this correspondence relation indicates a correspondence relation between a piece of image data to be selected by the selector 13 from among the plurality of pieces of image data DP0 to DP3 and a piece of arithmetic processing to be performed by the arithmetic processor 14 of the pieces of DSP processing DSPA to DSPC. Likewise, in this example, the "DSP processing DSPB" corresponds to the "ISP processing ISPC", and the "DSP processing DSPC" corresponds to the "ISP processing ISPA". Thus, the setting table TBL includes information about a plurality of correspondence relations.

The controller 18 specifies one correspondence relation of the plurality of correspondence relations included in the setting table on the basis of a processing content switching request included in the piece of control data CTL. The controller 18 determines a piece of image data to be selected by the selector 13 from among the plurality of pieces of image data DP0 to DP3 and determines a piece of software to be executed by the arithmetic processor 14 of the pieces of DSP software SWA to SWC on the basis of the specified correspondence relation, and controls operations of selectors 13 and 17 on the basis of such determination results. In addition, the controller 18 supplies, to the electric power-clock supply section 19, information about whether or not each of the image processors 12A to 12C is to perform the piece of image processing, on the basis of the correspondence relation specified by the piece of control data CTL.

Specifically, for example, in a case where a correspondence relation between the "DSP processing DSPA" and the "ISP processing ISPB" is specified from among the plurality of correspondence relations in the setting table TBL, the controller 18 performs control to cause the selector 13 to select the piece of image data DP2 generated by the image processor 12B that performs the "ISP processing ISPB", and performs control to cause the selector 17 to select the piece of DSP software SWA corresponding to the "DSP processing DSPA". In addition, the controller 18 supplies, to the electric power-clock supply section 19, information that the image processors 12A and 12B are to be operated and the image processor 12C is not to be operated. In other words, in this case, the arithmetic processor 14 performs a piece of arithmetic processing on the basis of the piece of image data DP2 generated by the image processing 12B that performs the "ISP processing ISPB"; therefore, it is not necessary for the image processor 12C to perform the piece of image processing. Thus, the controller 18 supplies, to the electric power-clock supply section 19, information that the image processors 12A and 12B are to perform the pieces of image processing and the image processor 12C is not to perform the piece of image processing.

The electric power-clock supply section 19 is configured to selectively supply electric power and the clock signal to each of the image processors 12A to 12C on the basis of an instruction from the controller 18. Specifically, the electric power-clock supply section 19 supplies electric power and the clock signal to an image processor that is to perform the piece of image processing of the image processors 12A, 12B, and 12C, and stops supply of electric power and the clock signal to an image processor that is not to perform the piece of image processing.

Here, the image processor 12 corresponds to a specific example of a "processor" in the present disclosure. One of the image processors 12A to 12C corresponds to a specific example of a "first data processor" in the present disclosure. The selector 13 corresponds to a specific example of a "selector" in the present disclosure. The arithmetic processor 14 corresponds to a specific example of an "arithmetic processor" in the present disclosure. The controller 18 corresponds to a specific example of a "controller" in the present disclosure. The electric power-clock supply section 19 corresponds to a specific example of a "supply section" in the present disclosure.

[Operation and Workings]

Next, description is given of an operation and workings of the image processing apparatus 1 according to the present embodiment.

(Overview of Overall Operation)

First, description is given of an overview of an overall operation of the image processing apparatus 1 with reference to FIG. 1. The controller 18 controls pieces of processing in the image processor 12 and the arithmetic processor 14 on the basis of the piece of control data CTL supplied from outside. The electric power-clock supply section 19 supplies electric power and the clock signal to an image processor that is to perform the piece of image processing of the image processors 12A to 12C and stops supply of electric power and the clock signal to an image processor that is not to perform the piece of image processing on the basis of an instruction from the controller 18. The input section 11 receives the piece of image data DP transmitted from the image sensor, and supplies this piece of image data DP as the piece of image data DP0 to the image processor 12. The image processor 12A of the image processor 12 performs the piece of image processing (ISP processing ISPA) on the basis of the piece of image data DP0 to generate the piece of image data DP1. The image processor 12B performs the piece of image processing (ISP processing ISPB) on the basis of the piece of image data DP1 to generate the piece of image data DP2. The image processor 12C performs the piece of image processing (ISP processing ISPC) on the basis of the piece of image data DP2 to generate the piece of image data DP3. The selector 13 selects one piece of image data from among the pieces of image data DP0 to DP3 and supplies the selected piece of image data to the arithmetic processor 14 on the basis of an instruction from the controller 18. The selector 17 selects one piece of software from among the pieces of DSP software SWA, SWB, and SWC stored in the memory 16 and supplies the selected piece of software to the arithmetic processor 14 on the basis of an instruction from the controller 18. The arithmetic processor 14 executes the piece of software supplied from the memory 16 to perform the piece of arithmetic processing on the piece of image data supplied from the selector 13. The output section 15 outputs a processing result by the arithmetic processor 14 as a piece of processing data DT.

(Detailed Operation)

The controller 18 specifies one correspondence relation from among the plurality of correspondence relations included in the setting table TBL on the basis of the processing content switching request included in the control data CTL. The controller 18 determines a piece of image data to be selected by the selector 13 from among the pieces of image data DP0 to DP3 and determines a piece of software to be executed by the arithmetic processor 14 of the pieces of DSP software SWA to SWC on the basis of the specified correspondence relation, and controls the operations of the selectors 13 and 17 on the basis of such determination results. In addition, the controller 18 supplies, to the electric power-clock supply section 19, information about whether or not each of the image processors 12A to 12C is to perform the piece of image processing, on the basis of the specified correspondence relation. The electric power-clock supply section 19 supplies electric power and the clock signal to an image processor that is to perform the piece of image processing of the image processors 12A, 12B, and 12C, and stops supply of electric power and the clock signal to an image processor that is not to perform the piece of image processing.

Hereinafter, the operation of the image processing apparatus 1 is described with an example in which a color image sensor 101 is coupled to the image processing apparatus 1 and an example in which a monochrome image sensor 102 is coupled to the image processing apparatus 1. In this example, the ISP processing ISPA to be performed by the image processor 12A is correction processing, the ISP processing ISPB to be performed by the image processor 12B is demosaic processing, and the ISP processing ISPC to be performed by the image processor 12C is color adjustment processing.

FIG. 3 illustrates an operation example of the image processing apparatus 1 to which the color image sensor 101 is coupled. The color image sensor 101 transmits the piece of image data DP to the image processing apparatus 1. The piece of image data DP includes a pixel value corresponding to an amount of received red light, a pixel value corresponding to an amount of received green light, and a pixel value corresponding to an amount of received blue light. The input section 11 of the image processing apparatus 1 receives this piece of image data DP, and supplies this piece of image data DP as the piece of image data DP0 to the image processor 12.

In this example, the controller 18 specifies a correspondence relation between the "DSP processing DSPB" and the "ISP processing ISPC" from among the plurality of correspondence relations in the setting table TBL. This indicates that the arithmetic processor 14 performs the "DSP processing DSPB" on the basis of the piece of image data DP3 supplied from the image processor 12C that performs the "ISP processing ISPC". In other words, in this example, the color image sensor 101 is coupled to the image processing apparatus 1; therefore, the image processor 12 performs the color adjustment processing (ISP processing ISPC) in addition to the correction processing (ISP processing ISPA) and the demosaic processing (ISP processing ISPB).

Accordingly, the controller 18 performs control to cause the selector 13 to select the piece of image data DP3 generated by the image processor 12C that performs the "ISP processing ISPC", and performs control to cause the selector 17 to select the piece of DSP software SWB corresponding to the "DSP processing DSPB". Thus, as indicated by a thick line in FIG. 3, the selector 13 selects the piece of image data DP3, and the selector 17 selects the piece of DSP software SWB. In addition, the controller 18 supplies, to the electric power-clock supply section 19, information that the image processors 12A, 12B, and 12C are to perform the pieces of image processing. The electric power-clock supply section 19 supplies electric power and the clock signal to the image processors 12A to 12C on the basis of an instruction from the controller 18.

FIG. 4 illustrates an operation example of the image processing apparatus 1 to which the monochrome image sensor 102 is coupled. The monochrome image sensor 102 transmits the piece of image data DP including a pixel value corresponding to an amount of received light to the image processing apparatus 1. The input section 11 of the image processing apparatus 1 receives this piece of image data DP, and supplies this piece of image data DP as the piece of image data DP0 to the image processor 12.

In this example, the controller 18 specifies the correspondence relation between the "DSP processing DSPA" and the "ISP processing ISPB" from among the plurality of correspondence relations in the setting table TBL. This indicates that the arithmetic processor 14 performs the "DSP processing DSPA" on the basis of the piece of image data DP2 supplied from the image processor 12B that performs the "ISP processing ISPB". In other words, in this example, the monochrome image sensor 102 is coupled to the image processing apparatus 1; therefore, the image processor 12 performs the correction processing (ISP processing ISPA) and the demosaic processing (ISP processing ISPB), and does not perform the color adjustment processing (ISP processing ISPC).

Accordingly, the controller 18 performs control to cause the selector 13 to select the piece of image data DP2 generated by the image processor 12B that performs the "ISP processing ISPB", and performs control to cause the selector 17 to select the piece of DSP software SWA corresponding to the "DSP processing DSPA". Thus, as indicated by a thick line in FIG. 4, the selector 13 selects the piece of image data DP2, and the selector 17 selects the piece of DSP software SWA. In addition, the controller 18 supplies, to the electric power-clock supply section 19, information that the image processors 12A and 12B are to perform the pieces of image processing and the image processor 12C is not to perform the piece of image processing. The electric power-clock supply section 19 supplies electric power and the clock signal to the imaging processors 12A and 12B and stops supply of electric power and the clock signal to the image processor 12C on the basis of an instruction from the controller 18.

Thus, the monochrome image sensor 102 is coupled to the image processing apparatus 1; therefore, it is not necessary to perform the color adjustment processing (ISP processing ISPC). Accordingly, supply of electric power and the clock signal to the image processor 12C that performs this ISP processing ISPC is stopped. Thus, in the image processing apparatus 1, it is possible to effectively reduce electric power consumption. In addition, the arithmetic processor 14 performs a piece of arithmetic processing on the basis of the piece of image data DP2 generated by the image processor 12B, which makes it possible to improve latency, as compared with a comparative example to be described below.

Comparative Example

Next, description is given of an image processing apparatus 1R according to the comparative example. The image processing apparatus 1R is configured to cause an image processor that does not perform a piece of image processing to output an inputted piece of image data as it is.

The image processing apparatus 1R includes an image processor 12R, an electric power-clock supply section 19R, and a controller 18R.

The image processor 12R includes three image processors 12RA, 12RB, and 12RC in this example. The image processor 12RA is configured to perform a piece of image processing (ISP processing ISPA) on the basis of a piece of image data supplied from the input section 11. The image processor 12RB is configured to perform a piece of image processing (ISP processing ISPB) on the basis of a piece of image data supplied from the image processor 12A. The image processor 12RC is configured to perform a piece of image processing (ISP processing ISPC) on the basis of a piece of image data supplied from the image processor 12RB. In addition, each of the image processors 12RA, 12RB, and 12RC is also able to perform a piece of processing to output an inputted piece of image data as it is on the basis of an instruction from the controller 18R. Electric power and a clock signal are supplied from the electric power-clock supply section 19R to each of the image processors 12RA, 12RB, and 12RC.

The electric power-clock supply section 19R is configured to supply electric power and the clock signal to each of the image processors 12RA to 12RC.

The controller 18R is configured to control pieces of processing in the image processor 12R and the arithmetic processor 14 on the basis of the piece of control data CTL supplied from outside. The controller 18R specifies one correspondence relation from among the plurality of correspondence relations included in the setting table TBL on the basis of the processing content switching request included in the control data CTL. The controller 18R determines an image processor that is to perform a piece of image processing and an image processor that is to output an inputted piece of image data as it is of the image processors 12RA to 12RC and determines a piece of software to be executed by the arithmetic processor 14 of the pieces of DSP software SWA to SWC on the basis of the specified correspondence relation, and controls operations of the image processors 12RA to 12RC and the selector 17 on the basis of such determination results.

Specifically, for example, in a case where the correspondence relation between the "DSP processing DSPA" and the "ISP processing ISPB" is specified from among the plurality of correspondence relations in the setting table TBL, the controller 18R performs control to cause the image processor 12B that performs the "ISP processing ISPB" and the image processor 12A preceding to the image processor 12B to perform the pieces of image processing, and performs control to cause the image processor 12C subsequent to the image processor 12B to output the inputted piece of image data as it is. In addition, the controller 18R performs control to cause the selector 17 to select the piece of DSP software SWA corresponding to the "DSP processing DSPA".

Thus, in the image processing apparatus 1R, even in a case where the image processor 12RC does not perform the ISP processing ISPC, electric power and the clock signal are supplied to the image processor 12RC, which consumes electric power. In addition, even in a case where the image processor 12RC does not perform the ISP processing ISPC in such a manner, the image processor 12C causes delay upon outputting the inputted piece of image data as it is.

In contrast, in the image processing apparatus 1 according to the present embodiment, as illustrated in FIG. 4, for example, in a case where the image processor 12C does not perform the ISP processing ISPC, it is possible to stop supply of electric power and the clock signal to the image processor 12C, which makes it possible to reduce electric power consumption. In addition, in a case where the image processor 12C does not perform the ISP processing ISPC in such a manner, the arithmetic processor 14 is able to perform a piece of arithmetic processing on the basis of the piece of image data DP2 supplied from the image processor 12B preceding to the image processor 12C, which makes it possible to improve latency.

Thus, in the image processing apparatus 1, the selector 13 selects one piece of image data from among the plurality of pieces of image data (image data DP0 to DP3), and the arithmetic processor 14 performs the piece of arithmetic processing selected from among the plurality of pieces of arithmetic processing (pieces of DSP processing DSPA to DSPC) on the basis of the piece of image data selected by the selector 13. The electric power-clock supply section 19 then selectively controls supply of electric power to the image processors 12A to 12C in accordance with the piece of image data selected by the selector 13. This makes it possible for the image processing apparatus 1 to effectively reduce electric power consumption in accordance with the pieces of image processing in the image processor 12 and improve latency.

[Effects]

As described above, in the present embodiment, one piece of image data is selected from among a plurality of pieces of image data, a piece of arithmetic processing selected from among a plurality of pieces of arithmetic processing is performed on the basis of the selected piece of image data, and supply of electric power to the image processor is selectively controlled in accordance with the selected piece of image data, which makes it possible to effectively reduce electric power consumption and improve latency.

Modification Example 1-1

In the embodiment described above, the selector 13 is provided that selects one piece of image data from among the pieces of image data DP0 to DP3; however, this selector 13 is mountable by any of various methods. For example, as with an image processing apparatus 1A illustrated in FIG. 6, the selector 13 may be configured with use of a memory access controller 13A and a memory 13B. The memory access controller 13A is configured to supply one of the pieces of image data DP0 to DP3 to the memory 13B on the basis of an instruction from the controller 18. The memory 13B is configured with use of, for example, a volatile memory such as a DRAM, and is configured to store a piece of image data supplied from the memory access controller 13A. The memory access controller 13A then supplies the stored piece of image data to the arithmetic processor 14.

Modification Example 1-2

In the embodiment described above, the image processor 12 includes three mage processors 12A to 12C; however, this is not limitative. For example, the image processor 12 may include two or less image processors or four or more image processors.

Modification Example 1-3

In the embodiment described above, the memory 16 stores three pieces of DSP software SWA to SWC; however, this is not limitative. For example, the memory 16 may store two or less pieces of DSP software or four or more pieces of DSP software.

Another Modification Example

In addition, two or more of these modification examples may be combined.

2. Second Embodiment

Next, description is given of an image processing apparatus 2 according to a second embodiment. In the present embodiment, an image output flag F is provided, and in a case where this image output flag F is "on", it is possible to output a piece of image data generated by the image processor 12. It is to be noted that components substantially the same as those of the image processing apparatus 1 according to the first embodiment described above are denoted by the same reference numerals, and description thereof is omitted as appropriate.

FIG. 7 illustrates a configuration example of the image processing apparatus 2. The image processing apparatus 2 includes an output section 25 and a controller 28.

The output section 25 is configured to output a processing result by the arithmetic processor 14 as a piece of processing data DT and output the piece of image data DP3 supplied from the image processor 12C as a piece of image data DPOUT.

The controller 28 is configured to control pieces of processing in the image processor 12 and the arithmetic processor 14 on the basis of the piece of control data CTL supplied from outside and control an operation of outputting the piece of image data DPOUT. The controller 28 includes the image output flag F. The image output flag F is a flag that sets whether or not the image processing apparatus 2 is to output the piece of image data DPOUT. In a case where the image output flag F is "on", the controller 28 performs control to cause the image processing apparatus 2 to output the piece of image data DPOUT, and in a case where the image output flag F is "off", the controller 28 performs control to cause the image processing apparatus 2 not to output the piece of image data DPOUT.

In the controller 28, one correspondence relation is specified from among the plurality of correspondence relations included in the setting table TBL on the basis of the processing content switching request included in the piece of control data CTL, and the image output flag F is set on the basis of an image output request included in the piece of control data CTL. As with the controller 18 according to the first embodiment, the controller 28 determines a piece of image data to be selected by the selector 13 from among the plurality of pieces of image data DP0 to DP3 and determines a piece of software to be executed of the pieces of DSP software SWA to SWC on the basis of the specified correspondence relation, and controls the operations of selectors 13 and 17 on the basis of such determination results.

In addition, the controller 28 supplies, to the electric power-clock supply section 19, information about whether or not each of the image processors 12A to 12C is to perform the piece of image processing, on the basis of the correspondence relation specified by the piece of control data CTL and the image output flag F set by the piece of control data CTL. Specifically, for example, in a case where the image output flag F is "on", the controller 28 supplies, to the electric power-clock supply section 19, information that the image processors 12A to 12C are to perform the pieces of image processing. In addition, for example, in a case where the image output flag F is "off", as with the controller 18 according to the first embodiment, the controller 28 supplies, to the electric power-clock supply section 19, information about whether or not each of the imaging processors 12A to 12C is to perform the piece of image processing, on the basis of the correspondence relation specified by the piece of control data CTL.

Here, the output section 25 corresponds to a specific example of an "output section" in the present disclosure. The image output flag F corresponds to a specific example of "flag data" in the present disclosure.

Hereinafter, the operation of the image processing apparatus 2 is described with an example in which the image output flag F is "on" and an example in which the image output flag F is "off". In this example, in the controller 28, the correspondence relation between the "DSP processing DSPA" and the "ISP processing ISPB" is specified from among the plurality of correspondence relations in the setting table TBL. This indicates that the arithmetic processor 14 performs the "DSP processing DSPA" on the basis of the piece of image data DP2 supplied from the image processor 12B that performs the "ISP processing ISPB".

FIG. 8 illustrates an operation example of the image processing apparatus 2 in a case where the image output flag F is "on". In this example, in the controller 28, the correspondence relation between the "DSP processing DSPA" and the "ISP processing ISPB" is specified; therefore, the controller 28 performs control to cause the selector 13 to select the piece of image data DP2 generated by the image processor 12B that performs the "ISP processing ISPB", and performs control to cause the selector 17 to select the piece of DSP software SWA corresponding to the "DSP processing DSPA". Thus, as indicated by a thick line in FIG. 8, the selector 13 selects the piece of image data DP2 and the selector 17 selects the piece of DSP software SWA. In addition, the image output flag F is "on"; therefore, the controller 28 supplies, to the electric power-clock supply section 19, information that the image processors 12A, 12B, and 12C are to perform the pieces of image processing. In other words, in a case where the image output flag F is "on", the output section 25 outputs the piece of image data DP3 supplied from the image processor 12C as the piece of image data DPOUT; therefore, it is necessary for the image processor 12C to perform the piece of image processing. Accordingly, the controller 28 supplies, to the electric power-clock supply section 19, information that the image processors 12A, 12B, and 12C are to perform the pieces of image processing. The electric power-clock supply section 19 supplies electric power and the clock signal to the image processors 12A to 12C on the basis of an instruction from the controller 28.

Thus, in a case where the image output flag F is "on", in the image processing apparatus 2, as with the image processing apparatus 1 according to the first embodiment, it is possible to improve latency in accordance with the pieces of image processing in the image processor 12. In other words, in the image processing apparatus 2, as with this example, the arithmetic processor 14 is able to perform a piece of arithmetic processing on the basis of, for example, the piece of image data DP2 supplied from the image processor 12B, which makes it possible to improve latency.

FIG. 9 illustrates an operation example of the image processing apparatus 2 in a case where the image output flag F is "off". In this example, in the controller 28, the correspondence relation between the "DSP processing DSPA" and the "ISP processing ISPB" is specified; therefore, the controller 28 performs control to cause the selector 13 to select the piece of image data DP2 supplied from the image processor 12B that performs the "ISP processing ISPB", and performs control to cause the selector 17 to select the piece of DSP software SWA corresponding to the "DSP processing DSPA". Thus, as indicated by a thick line in FIG. 9, the selector 13 selects the piece of image data DP2 and the selector 17 selects the piece of DSP software SWA. In addition, the image output flag F is "off"; therefore, the controller 28 supplies, to the electric power-clock supply section 19, information that that the image processors 12A and 12B are to be operated and the image processor 12C is not to be operated, on the basis of the correspondence relation specified by the piece of control data CTL. The electric power-clock supply section 19 supplies electric power and the clock signal to the image processors 12A and 12B and stops supply of electric power and the clock signal to the image processor 12C on the basis of an instruction from the controller 18.

Thus, in a case where the image output flag F is "off", in the image processing apparatus 2, as with the image processing apparatus 1 according to the first embodiment, it is possible to effectively reduce electric power consumption and improve latency in accordance with the pieces of image processing in the image processor 12.

Thus, in the image processing apparatus 2, supply of electric power to the image processors 12A to 12C is controlled on the basis of the image output flag F that indicates whether or not the output section 25 is to output the piece of image data DPOUT. Accordingly, in a case where the image output flag F is "on", it is possible to improve latency in accordance with the pieces of image processing in the image processor 12. In addition, in a case where the image output flag F is "off", it is possible to effectively reduce electric power consumption and improve latency in accordance with the pieces of image processing in the image processor 12.

In the present embodiment, supply of electric power to an image processor is controlled on the basis of an image output flag that indicates whether or not an output section is to output a piece of image data, which makes it possible to effectively reduce electric power consumption and improve latency. Other effects are similar to those in the first embodiment described above.

Modification Example 2

Any of the modification examples of the first embodiment described above may be applied to the image processing apparatus 2 according to the embodiment described above.

3. Third Embodiment

Next, description is given of an image processing apparatus 3 according to a third embodiment. In the present embodiment, supply of electric power and a clock signal to the image processor 12 is controlled in accordance with whether or not the arithmetic processor completes a piece of arithmetic processing. It is to be noted that components substantially the same as those of the image processing apparatus 2 according to the second embodiment described above are denoted by the same reference numerals, and description thereof is omitted as appropriate.

FIG. 10 illustrates a configuration example of the image processing apparatus 3. The image processing apparatus 3 includes an input section 31, an arithmetic processor 34, and a controller 38.

The input section 31 is configured to receive the piece of image data DP transmitted from the image sensor, supply this piece of image data DP as the piece of image data DP0 to the image processor 12 and make a synchronization notification N1 corresponding to the piece of image data DP to the controller 38.

The arithmetic processor 34 is configured to perform a piece of arithmetic processing on a piece of image data supplied from the selector 13 by executing a piece of software supplied from the memory 16. In addition, in a case where the piece of arithmetic processing has been completed, the arithmetic processor 34 makes a completion notification N2 to the controller 38.

The controller 38 is configured to control pieces of processing in the image processor 12 and the arithmetic processor 34 on the basis of the piece of control data CTL supplied from outside, the synchronization notification N1 supplied from the input section 31, and the completion notification N2 supplied from the arithmetic processor 34.

FIG. 11 illustrates an operation example of the image processing apparatus 3. FIG. 12A illustrates an operation state of the image processing apparatus 3, and FIG. 12B illustrates another operation state of the image processing apparatus 3. In this example, the controller 38 specifies the correspondence relation between the "DSP processing DSPA" and the "ISP processing ISPB" from among the plurality of correspondence relations in the setting table TBL. In addition, the image output flag F is set to "off".

In a synchronization period P from a timing t1 to a timing t2, as illustrated in FIG. 12A, the electric power-clock supply section 19 supplies electric power and the clock signal to the image processors 12A and 12B on the basis of an instruction from the controller 38. This causes the image processor 12 (the image processors 12A and 12B) to perform pieces of image processing on the basis of a piece of image data for one frame included in the piece of image data DP0 in the synchronization period P from the timing t1 to the timing t2. The arithmetic processor 34 then performs a piece of arithmetic processing on the basis of the piece of image data supplied from this image processor 12. In this example, the arithmetic processor 34 is not able to complete the piece of arithmetic processing based on this piece of image data for one frame in this synchronization period P from the timing t1 to the timing t2, and continuously performs this piece of arithmetic processing.

The controller 38 receives the synchronization notification N1 in accordance with a synchronization signal SYNC at the timing t1. The controller 38 performs setting (stop setting) on the basis of this synchronization notification N1 to stop the operation of the image processor 12 in the next synchronization period P starting from the timing t2.

In a synchronization period P from the timing t2 to a timing t4, as illustrated in FIG. 12B, the electric power-clock supply section 19 stops supply of electric power and the clock signal to the image processors 12A to 12C on the basis of an instruction from the controller 38. In other words, in the previous synchronization period P, the controller 38 performs setting to stop the operation of the image processor 12, which causes the electric power-clock supply section 19 to stop supply of electric power and the clock signal to the image processors 12A to 12C. Accordingly, as illustrated in FIG. 11, the image processor 12 does not perform pieces of image processing in the synchronization period P from the timing t2 to the timing t4. In this synchronization period P from the timing t2 to the timing t4, the arithmetic processor 34 continues the piece of arithmetic processing based on the piece of image data for one frame in the previous synchronization period P.

The controller 38 receives the synchronization notification N1 in accordance with the synchronization signal SYNC at the timing t2. The controller 38 performs setting (stop setting) on the basis of this synchronization notification N1 to stop the operation of image processor 12 in the next synchronization period P starting from the timing t4.

Then, at the timing t3, the arithmetic processor 34 completes the piece of arithmetic processing and makes the completion notification N2 to the controller 38. The controller 38 performs setting (operation setting) on the basis of this completion notification N2 to perform the operation of the image processor 12 in the next synchronization period P starting from the timing t4. In other words, the stop setting is canceled, and the operation setting is performed.

In a synchronization period P from the timing t4 to a timing t5, as illustrated in FIG. 12A, the electric power-clock supply section 19 supplies electric power and the clock signal to the image processors 12A and 12B on the basis of an instruction from the controller 38. In other words, in the previous synchronization period P, the controller 38 performs setting to perform the operation of the image processor 12, which causes the electric power-clock supply section 19 to supply electric power and the clock signal to the image processors 12A and 12B. Accordingly, as illustrated in FIG. 11, the image processor 12 (the image processors 12A and 12B) performs the pieces of image processing on the basis of a piece of image data for one frame included in the piece of image data DP0 in the synchronization period P from the timing t4 to the timing t5. The arithmetic processor 34 then performs a piece of arithmetic processing on the basis of the piece of image data supplied from this image processor 12. The arithmetic processor 34 is not able to complete the piece of arithmetic processing based on this piece of image data for one frame in this synchronization period from the timing t4 to the timing t5, and continuously performs this piece of arithmetic processing in a subsequent synchronization period P.

The controller 38 receives the synchronization notification N1 in accordance with the synchronization signal SYNC at the timing t4. The controller 38 performs setting (stop setting) on the basis of this synchronization notification N1 to stop the operation of the image processor 12 in the next synchronization period P starting from the timing t5.

In a synchronization period from the timing t5 to a timing t7, as illustrated in FIG. 12B, the electric power-clock supply section 19 stops supply of electric power and the clock signal to the image processors 12A to 12C on the basis of an instruction from the controller 38. In other words, in the previous synchronization period P, the controller 38 performs setting to stop the operation of the image processor 12, which causes the electric power-clock supply section 19 to stop supply of electric power and the clock signal to the image processors 12A to 12C. Accordingly, as illustrated in FIG. 11, the image processor 12 does not perform the pieces of image processing in the synchronization period from the timing t5 to the timing t7. In this synchronization period P from the timing t5 to the timing t7, the arithmetic processor 34 continues the piece of arithmetic processing based on the piece of image data for one frame in the previous synchronization period P.

The controller 38 receives the synchronization notification N1 in accordance with the synchronization signal SYNC at the timing t5. The controller 38 performs setting (stop setting) on the basis of this synchronization notification N1 to stop the operation of the image processor 12 in the next synchronization period P starting from the timing t7.

Then, at the timing t6, the arithmetic processor 34 completes the piece of arithmetic processing, and makes the completion notification N2 to the controller 38. The controller 38 performs setting (operation setting) on the basis of this completion notification N2 to perform the operation of the image processor 12 in the next synchronization period P starting from the timing t7. In other words, the stop setting is canceled, and the operation setting is performed.

Thereafter, the image processing apparatus 3 repeats this operation.

FIG. 13 illustrates an operation example of the image processing apparatus 3.

In a case where the image processing apparatus 3 starts streaming (step S101), the controller 38 first confirms whether or not a trigger has occurred (step S102). In a case where no trigger has occurred ("N" in step S102), this step S102 is repeated until a trigger occurs.

In a case where a trigger has occurred ("Y" in step S102), the controller 38 confirms what kind of trigger the trigger is (step S103).

In step S103, in a case where the trigger is the synchronization notification N1 ("SYNCHRONIZATION NOTIFICATION N1" in step S103), the controller 38 confirms whether or not the processing content switching request is included on the basis of the piece of control data CTL (step S104). In a case where the switching request is included ("Y" in step S104), the controller 38 stops the pieces of DSP processing, and performs processing switching on the basis of a correspondence relation specified by the switching request from among the plurality of correspondence relations included in the setting table TBL (step S105). The flow then proceeds to step S108.

In step S104, in a case where the switching request is not included ("N" in step S104), the controller 38 confirms whether or not the image output flag F is "on" (step S106). In a case where the image output flag F is "on" ("Y" in step S106), the flow proceeds to step S109.

In step S106, in a case where the image output flag F is "off" ("N" in step S106), the controller 38 performs stop setting to stop the pieces of ISP processing in the image processor 12 in the next synchronization period (step S107). This causes the electric power-clock supply section 19 to stop supply of electric power and the clock signal to the image processors 12A to 12C in the next synchronization period P. The flow then proceeds to step S111.

In step S103, in a case where the trigger is the completion notification N2 ("COMPLETION NOTIFICATION N2" in step S103), the controller 38 confirms whether or not the image output flag F is "on" (step S108). In a case where the image output flag F is "on" ("Y" in step S108), the controller 38 performs operation setting to perform all the pieces of ISP processing in the image processor 12 in the next synchronization period P (step S109). Accordingly, the electric power-clock supply section 19 supplies electric power and the clock signal to the image processors 12A to 12C in the next synchronization period P. In addition, in a case where the image output flag F is "off" ("Y" in step S108), the controller 38 performs operation setting to perform a piece of ISP processing corresponding to a specified correspondence relation (step S110). Accordingly, the electric power-clock supply section 19 supplies electric power and the clock signal to an image processor that is to perform the piece of image processing of the image processors 12A to 12C on the basis of the specified correspondence relation in the next synchronization period P.

The controller 38 then confirms whether or not the streaming has ended (step S111). In a case where the streaming has not ended ("N" in step S111), the flow returns to step S102, and pieces of processing in steps S102 to S110 are repeated until the streaming ends. In a case where the streaming has ended ("Y" in step S111), this flow ends.

Thus, in the image processing apparatus 3, supply of electric power to the image processors 12A to 12C is controlled on the basis of whether or not the arithmetic processor 34 completes the piece of processing, which makes it possible to effectively reduce electric power consumption.

In the present embodiment, supply of electric power to the image processors 12A to 12C is controlled on the basis of whether or not the arithmetic processor 34 completes the piece of processing, which makes it possible to effectively reduce electric power consumption. Other effects are similar to those in the second embodiment described above.

Modification Example 3

Any of the modification examples of the first embodiment described above may be applied to the image processing apparatus 2 according to the embodiment described above.

Although the present technology has been described above referring to some embodiments and modification examples, the technology is not limited to these embodiments and the like, and may be modified in a variety of ways.

For example, in the embodiments described above, the present technology is applied to an image processing apparatus that performs a piece of image processing, but this is not limitative. The present technology is applicable to information processing apparatuses that perform various pieces of information processing. Specifically, the present technology is applicable to, for example, a processing apparatus to which a piece of audio data is inputted.

It is to be noted that the effects described herein are merely illustrative and non-limiting, and other effects may be included.

It is to be noted that the present technology may have the following configurations. According to the present technology having the following configurations, it is possible to reduce electric power consumption.

(1)
An information processing apparatus including:
a processor including a first data processor that is configured to perform a piece of first data processing on the basis of a piece of first data to thereby generate a piece of second data;
a selector that selects one piece of data from among a plurality of pieces of data including the piece of first data and the piece of second data;
an arithmetic processor that is configured to selectively perform one of a plurality of pieces of arithmetic processing, and performs a piece of arithmetic processing selected from among the plurality of pieces of arithmetic processing on the basis of the piece of data selected by the selector; and
a supply section that controls supply of electric power to the first data processor in accordance with the piece of data selected by the selector from among the plurality of pieces of data.

(2)
The information processing apparatus according to (1), including a controller that determines the piece of data to be selected by the selector from among the plurality of pieces of data, and determines the piece of arithmetic processing to be performed by the arithmetic processor of the plurality of pieces of arithmetic processing.

(3)
The information processing apparatus according to (2), in which the controller has a piece of correspondence information indicating a correspondence relation between the piece of data to be selected by the selector from among the plurality of pieces of data and the piece of arithmetic processing to be performed by the arithmetic processor of the plurality of pieces of arithmetic processing, and uses the piece of correspondence information to determine the piece of data to be selected by the selector and determine the piece of arithmetic processing to be performed by the arithmetic processor.

(4)
The information processing apparatus according to (3), in which the controller has a plurality of pieces of the correspondence information, and determines the piece of data to be selected by the selector and determines the piece of arithmetic processing to be performed by the arithmetic processor on the basis of the piece of correspondence information corresponding to a request from outside of the plurality of pieces of the correspondence information.

(5)
The information processing apparatus according to any one of (1) to (4), in which in a case where the selector selects the piece of first data, the supply section stops supply of electric power to the first data processor.

(6)
The information processing apparatus according to any one of (1) to (5), further including an output section that is configured to output a piece of generation data generated by the processor, in which
the supply section further controls supply of electric power to the first data processor on the basis of a piece of flag data indicating whether or not the output section is to output the piece of generation data.

(7)
The information processing apparatus according to (6), in which
in a case where the selector has selected the piece of first data,
the supply section supplies electric power to the first data processor in a case where the piece of flag data indicates that the output section is to output the piece of generation data, and
the supply section stops supply of electric power to the first data processor in a case where the piece of flag data indicates that the output section is not to output the piece of generation data.

(8)
The information processing apparatus according to any one of (1) to (7), in which the supply section controls supply of electric power to the first data processor further on the basis of whether or not the arithmetic processor has completed the piece of arithmetic processing.

(9)
The information processing apparatus according to (8), in which
in a case where the selector has selected the piece of second data,
the supply section stops supply of electric power to the first data processor in a case where the arithmetic processor has not completed the piece of arithmetic processing, and
the supply section supplies electric power to the first data processor in a case where the arithmetic processor has completed the piece of arithmetic processing.

(10)
The information processing apparatus according to any one of (1) to (9), in which the supply section further controls supply of a clock signal to the first data processor in accordance with the piece of data selected by the selector from among the plurality of pieces of data.

(11)
The information processing apparatus according to any one of (1) to (10), in which
the processor further includes a second data processor that is configured to perform a piece of second data processing on the basis of the piece of second data to thereby generate a piece of third data,
the plurality of pieces of data includes the piece of third data, and
the supply section further controls supply of electric power to the second data processor.

(12)
The information processing apparatus according to any one of (1) to (11), in which
the piece of first data and the piece of second data include pieces of image data, and the piece of first data processing includes a piece of image processing.

(13) The information processing apparatus according to any one of (1) to (12), in which the plurality of pieces of arithmetic processing includes a piece of arithmetic processing using a learning model.

(14) An information processing method including:
selecting one piece of data from among a plurality of pieces of data in a processor including a first data processor that is configured to perform a piece of first data processing on the basis of a piece of first data to thereby generate a piece of second data, the plurality of pieces of data including the piece of first data and the piece of second data;
selecting one piece of arithmetic processing from among a plurality of pieces of arithmetic processing;
performing the selected piece of arithmetic processing on the basis of the selected piece of data; and
controlling supply of electric power to the first data processor in accordance with the piece of data selected from among the plurality of pieces of data.

This application claims the priority on the basis of Japanese Patent Application No. 2020-131127 filed on Jul. 31, 2020 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An information processing apparatus comprising:
a processor including a first data processor that is configured to perform a piece of first data processing based on a piece of first data to generate a piece of second data;
a selector configured to select one piece of data from a plurality of pieces of data including the piece of first data and the piece of second data;
an arithmetic processor configured to:
selectively perform one of a plurality of pieces of arithmetic processing, and
perform a piece of arithmetic processing from the plurality of pieces of arithmetic processing based on the selected one piece of data; and
a supply section configured to control supply of electric power to the first data processor based on the selected one piece of data from the plurality of pieces of data.

2. The information processing apparatus according to claim 1, comprising a controller configured to:
determine the one piece of data from the plurality of pieces of data for the selection by the selector, and
determine the piece of arithmetic processing from the plurality of pieces of arithmetic processing for the arithmetic processor.

3. The information processing apparatus according to claim 2, wherein
the controller includes a piece of correspondence information that indicates a correspondence relation between the one piece of data and the piece of arithmetic processing, and
the controller is further configured to determine, based on the piece of correspondence information, the one piece of data and the piece of arithmetic processing.

4. The information processing apparatus according to claim 3, wherein
the controller includes a plurality of pieces of correspondence information, and
the controller is further configured to determine, based on the piece of correspondence information corresponding to a request from outside of the plurality of pieces of correspondence information, the one piece of data and the piece of arithmetic processing.

5. The information processing apparatus according to claim 1, wherein the supply section is further configured to stop supply of electric power to the first data processor based on determination that the selector selects the piece of first data.

6. The information processing apparatus according to claim 1, wherein
the processor is configured to generate a piece of generation data,
an output section is configured to output the generated piece of generation data, and
the supply section is further configured to control supply of electric power to the first data processor based on a piece of flag data that indicates whether or not the output section is to output the generated piece of generation data.

7. The information processing apparatus according to claim 6, wherein
in a case where the selector selects the piece of first data,
the supply section is further configured to supply electric power to the first data processor based on determination that the piece of flag data indicates that the output section is to output the generated piece of generation data, and
the supply section is further configured to stop supply of electric power to the first data processor based on determination that the piece of flag data indicates that the output section is not to output the piece of generation data.

8. The information processing apparatus according to claim 1, wherein the supply section is further configured to control supply of electric power to the first data processor based on determination that whether or not the piece of arithmetic processing is completed.

9. The information processing apparatus according to claim 8, wherein
in a case where the selector selects the piece of second data,
the supply section is further configured to stop supply of electric power to the first data processor based on determination that the piece of arithmetic processing is not completed, and
the supply section is further configured to supply electric power to the first data processor based on determination that the piece of arithmetic processing is completed.

10. The information processing apparatus according to claim 1, wherein the supply section further is further configured to control supply of a clock signal to the first data processor based on the selected one piece of data from the plurality of pieces of data.

11. The information processing apparatus according to claim 1, wherein
the processor further includes a second data processor that is configured to perform a piece of second data processing based on the piece of second data to generate a piece of third data, the plurality of pieces of data includes the piece of third data, and the supply section is further configured to control supply of electric power to the second data processor.

12. The information processing apparatus according to claim 1, wherein the piece of first data and the piece of second data comprise pieces of image data, and the piece of first data processing comprises a piece of image processing.

13. The information processing apparatus according to claim 1, wherein the plurality of pieces of arithmetic processing includes the piece of arithmetic processing based on a learning model.

14. An information processing method, comprising:

selecting one piece of data from a plurality of pieces of data in a processor including a first data processor, wherein the first data processor is configured to perform a piece of first data processing based on a piece of first data to generate a piece of second data, and the plurality of pieces of data includes the piece of first data and the piece of second data;

selecting one piece of arithmetic processing from a plurality of pieces of arithmetic processing;

performing the selected one piece of arithmetic processing based on the selected one piece of data; and controlling supply of electric power to the first data processor based on the selected one piece of data from the plurality of pieces of data.

* * * * *